US012705687B2

(12) United States Patent
Gond et al.

(10) Patent No.: US 12,705,687 B2
(45) Date of Patent: Aug. 11, 2026

(54) REAL-TIME SPHERICAL LIGHT FIELD RECONSTRUCTION FROM A SINGLE OMNIDIRECTIONAL IMAGE

(71) Applicants: Manu Gond, Sundsvall (SE); Emin Zerman, Sundsvall (SE); Sebastian Knorr, Berlin (DE); Mårten Sjöström, Sundsvall (SE)

(72) Inventors: Manu Gond, Sundsvall (SE); Emin Zerman, Sundsvall (SE); Sebastian Knorr, Berlin (DE); Mårten Sjöström, Sundsvall (SE)

( * ) Notice: Subject to any disclaimer, the term of this patent is extended or adjusted under 35 U.S.C. 154(b) by 0 days.

(21) Appl. No.: 18/957,039

(22) Filed: Nov. 22, 2024

(65) Prior Publication Data

US 2025/0166118 A1 May 22, 2025

Related U.S. Application Data

(60) Provisional application No. 63/602,305, filed on Nov. 22, 2023.

(51) Int. Cl.

| | |
|---|---|
| ***G06T 3/16*** | (2024.01) |
| ***G06T 5/80*** | (2024.01) |
| ***G06T 7/50*** | (2017.01) |
| ***H04N 13/122*** | (2018.01) |
| ***H04N 13/282*** | (2018.01) |

(52) U.S. Cl.

CPC .................. *G06T 3/16* (2024.01); *G06T 5/80* (2024.01); *G06T 7/50* (2017.01); *H04N 13/122* (2018.05); *H04N 13/282* (2018.05); *G06T 2207/10016* (2013.01); *G06T 2207/20084* (2013.01)

(58) Field of Classification Search

None

See application file for complete search history.

(56) References Cited

U.S. PATENT DOCUMENTS

| | | | | |
|---|---|---|---|---|
| 11,113,832 | B2 * | 9/2021 | Wadhwa | G06V 20/10 |
| 2017/0076429 | A1 * | 3/2017 | Russell | G06T 15/04 |
| 2018/0097867 | A1 * | 4/2018 | Pang | H04N 5/2226 |
| 2018/0322611 | A1 * | 11/2018 | Bang | G06T 3/12 |
| 2023/0177710 | A1 * | 6/2023 | Lo | G06T 7/557 382/154 |
| 2023/0370708 | A1 * | 11/2023 | Safdari | G06T 15/506 |

FOREIGN PATENT DOCUMENTS

| | | | | |
|---|---|---|---|---|
| WO | WO-2020069058 A1 * | 4/2020 | | H04N 19/46 |

* cited by examiner

*Primary Examiner* — Tyler W. Sullivan

(74) *Attorney, Agent, or Firm* — Jeffrey Pearce

(57) ABSTRACT

Using two neural networks—a reconstruction network and a refinement network—an image processing system and related method of operation converts omnidirectional image information, for example from a spherical camera, into a cubemap, from which, for each image frame, it reconstructs each of six cube faces of cubes in the cubemap into an array of the cube faces and, in a refinement process, removes border artifacts. The resulting frames can then be applied to a display for viewing by a user, for example, in a telepresence or augmented reality scenario. The invention thus reconstructs a spherical light field (LF) from a single one of the omnidirectional images, where the spherical LF represents spatial and angular information of the scene.

10 Claims, 5 Drawing Sheets

10
20
21
360° → ERP
25
21
20*
ERP→CMP
40
45
Reconstruction Network
50
55
M
60
80
Refinement Network
70
DISP
90

FIG. 2B
300
Conv2D
ReLU
Conv2D
ReLU
FIG. 2C
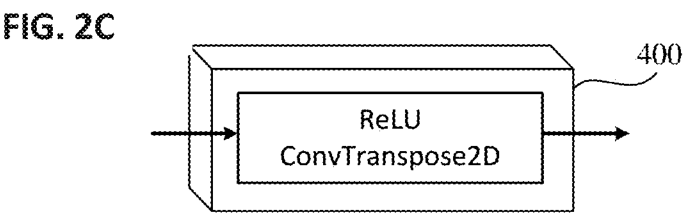
FIG. 2D
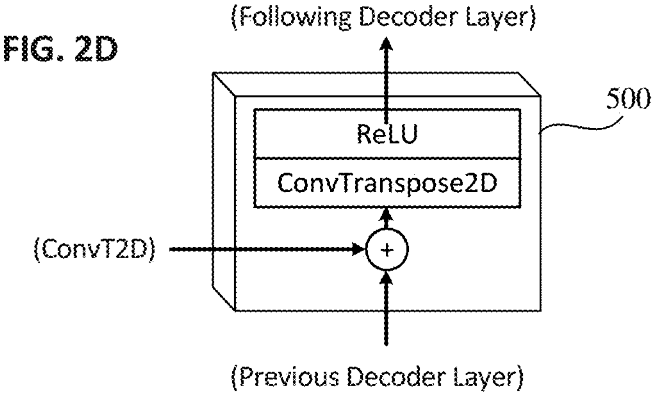

10
700
Frames
SUB-APERTURE EXTRACTION
701
6DoF
702
703
704
FRAME RENDERING
ELEMENT RENDERING
DEPTH CALCULATION
705
SIZE/ ORIENTATION ADJUSTMENT
706
PERSPECTIVE
707
MASKING
708
OVERLAY
709
DISP
90

REAL-TIME SPHERICAL LIGHT FIELD RECONSTRUCTION FROM A SINGLE OMNIDIRECTIONAL IMAGE

REFERENCE TO RELATED APPLICATIONS

This application claims priority of U.S. Provisional Patent Application No. 63/602,305, which was filed 22 Nov. 2023.

TECHNICAL FIELD

This invention relates to image processing, in particular in the area of computer graphics.

BACKGROUND OF THE INVENTION

A telepresence system enables a representation of a remote scene in real time. This makes it a viable tool for a wide variety of uses, such as industrial remote operation of heavy machinery to avoid safety risks. Examples of such industries include construction, mining, forestry, and underwater exploration. Such a system should allow a natural interaction with the remote scene. Just one other of the many possible uses is remote viewing of properties and buildings.

Telepresence systems use the current developments in Virtual Reality (VR), Head-Mounted Display (HMD), network technologies (like 4G and 5G), and consumer cameras to provide direct video feed of the environment. View synthesis methods can be used to further improve awareness of the on-site environment. The new views generated using view synthesis methods have been investigated for use in fields such as forestry and underwater operations.

Six degrees-of-freedom (DoF) are required for a full immersive experience. The 6DoF include the three translational motions of forward-backward, left-right, and up-down, plus the three rotational motions of yaw, roll and pitch. Most current telepresence methods are limited to 3DoF but can be extended to 6DoF with the help of view synthesis approaches, which use reference views to render new views from different viewpoints, thereby achieving 6DoF.

Recent work in novel view synthesis includes different approaches that can be categorized as i) depth-image-based methods that use input images with corresponding depth maps to generate new views; ii) multi-layer-image-based methods that use a layer of multiple images at different depths, and iii) sampling and fully learning-based methods that learn to synthesize new views directly from input images without depth information.

Depth-image-based methods commonly suffer from shape distortion and pixel misalignment when the depth maps are inaccurate or noisy, and the correction of these errors increases the inference time of the pipeline, i.e., making it slower and limiting usability in real-time applications. Depth-image-based methods are derived from the Depth-Image-Based-Rendering (DIBR) technique. A straightforward approach for lightfield (LF) reconstruction uses a convolutional neural network (CNN) to estimate depth, followed by a warping operator to infer target views, and a separate refinement network to handle warping artifacts. The approach of forcing a network to learn the depth estimation without ground truth depth data can be traced back to stereo prediction using the known Deep3D system.

Other known approaches use depth images predicted by a separate network or their own end-to-end frameworks to estimate optical flow, appearance flow, or both, to synthesize the LF. In the case of view synthesis with omnidirectional images (ODIs), some methods use a forward splatting operator to generate target views. Approaches to reconstruct a light field can theoretically be extended to spherical LF reconstruction, but in practice the reconstruction of a N×N spherical LF would increase the inference time by $N^2$. Additionally, these methods are limited in the sense that the warping operators (forward splatting) designed for ODI require the estimation of intermediate depth maps and suffer from shape distortion and pixel misalignment cases with inaccurate or noisy depth maps. Two proposals for monocular depth estimation are known from "BiFuse: Monocular 360° Depth Estimation via Bi-Projection Fusion", Fu-En Wang, et al. Proceedings of the IEEE/CVF Conference on Computer Vision and Pattern Recognition, 2020, pp. 462-471; and "UniFuse: Unidirectional Fusion for 360° Panorama Depth Estimation", Jiang, et al., which may be found at arxiv.org/pdf/2102.03550.pdf.

Multi-layer-image-based methods are not limited by these issues but instead require a large number of layers to achieve good visual quality. This can increase inference time as well. Learning-based methods can be trained to learn the geometrical properties of a scene and can infer final views directly, which makes them suitable for cases where inference time is a crucial factor, but these methods typically suffer from poor visual quality if the amount of training data is not sufficient. Multi-layer-image-based methods use more than one plane to describe images and there are multiple representations to do so, e.g., Multi Plane Image (MPI), Multi Sphere Image (MSI), Multi Depth Panorama (MDP), and Multi Cylinder Image (MCI).

MPI representations use a set of parallel planes at fixed depths containinga corresponding image and alpha map. The parallel planes allow methods to render novel views built on a fixed or variable number of planes. For view synthesis with ODIs, Serrano et al. ("Motion parallax for 360 RGBD video", *IEEE Transactions on Visualization and Computer Graphics* 25, 5 (2019), 1817-1827) introduced a three-layer scene representation, while some other known methods use custom formats designed for such images.

Multi-layer-image based reconstruction methods have limitations that stem from the requirement of using multi-camera rigs to generate their layered image representations. Another shortcoming is the demand for a large number of layers to achieve good visual results, which generally increases time. Furthermore, only one view is synthesized at a time, which causes the inference time to increase to $N^2$ if the goal is real-time N×N spherical LF reconstruction.

Sampling-based methods reconstruct LFs from sparse inputs by optimizing sparsity in the Fourier spectrum, using epipolar-plane images with CNNs, and using the shearlet transform. Some methods use pseudo 4D CNNs to reconstruct the LF. Learning-based methods try to estimate the novel views directly from the input views. Here, the warping and occlusion handling kernel cannot learn the distortion pattern of ODIs without having a large amount of training data.

Neural Radiance Fields (NeRF) belong to the class of learning-based methods that learn a function to render complex scenes. NeRF was extended to ODIs, as proposed by Gu et al. in "Omni-NeRF: Neural Radiance Field from 360° Image Captures", 1-6, (2022), which can be found at doi.org/10.1109/icme52920.2022.9859817. However, NeRF is limited in terms of generalization as it needs to be trained for each scene separately and is therefore not practical for in real-time applications.

SUMMARY OF THE INVENTION

In broad terms, the invention provides a system that uses a learning-based method for spherical light field reconstruction from a single omnidirectional image. To accomplish this, embodiments use two different networks, a first of which learns to reconstruct the light field in cubemap projection (CMP) format given the six cube faces of an omnidirectional image and the corresponding cube face positions as input. The second network then refines the reconstructed cubemaps in equirectangular projection (ERP) format by removing cubemap border artifacts and learns geometric features implicitly for both translation and zooming by application of an appropriate cost function.

in particular, embodiments of the invention provide an image processing method and system that operate by: receiving frame data in an equirectangular projection (ERP) format from a camera that captures omnidirectional images of an imaged scene as a series of frames; for each of the series of frames, converting the frame data into a cubemap projection (CMP) format; and, in a reconstruction network, reconstructing each of six cube faces $$\left(L^i_{CMP}\right)$$

of cubes in the cubemap into an array of the cube faces $$\left(\hat{L}^i_{CMP}(x, u)\right);$$

thereby reconstructing a spherical light field (LF) from a single one of the omnidirectional images, where the spherical LF represents spatial and angular information of the scene.

A refinement network may then remove border artifacts from the cubemap and apply a cost function to extract image features for both translation and zooming in the cubemap.

The camera may be a spherical camera, that is, it may be a camera that captures spherical images.

As part of the reconstruction, the cubemap, from which the border artifacts have been removed, may be converted back into the ERP format. The converted cubemap may then be passed to a display system for viewing by a user.

In an optional "Augmented Reality" (AR) implementation, embodiments may also reconstruct a plurality of omnidirectional sub-aperture video frames for each frame received from the camera, where each sub-aperture video frame corresponds to a respective perspective of the scene. It then receives position and orientation information from and of the display and renders additional video frames from the sub-aperture of the captured scene from a current viewpoint the display according to its current orientation and position. Then it causes the rendered additional video frames to be overlayed onto a default view of the scene displayed by the display.

In the AR implementation, at least one element may be rendered and composited onto each sub-aperture video frame. A respective depth in the scene at which each element is to be placed may also be calculated; the size and angular orientation of each respective element according to its depth in the scene to be overlayed can be adjusted, as well as the perspective of each element when a viewpoint of the display has changed. The rendered view of the element may also be masked corresponding to depth and/or distance-dependent visual occlusion caused by other real objects existing in the scene and being displayed.

BRIEF DESCRIPTION OF THE DRAWINGS

FIGS. 2B, 2C and 2D show details of three of the processing layers in the network architecture of FIG. 2A.

DETAILED DESCRIPTION

By way of convenience, embodiments of the invention are referred to here by the name LFSphereNet, which is the name used by the inventors during testing and prototyping. As is described below, LFSphereNet extends 3DoF imaging to 6DoF using a single omnidirectional image (ODI). In particular, whereas the prior art attempts to recreate a light field by combining multiple planar views, the invention is able to reconstruct the light field from a single spherical, omnidirectional image. To achieve this, embodiments use a learning-based method for spherical light field reconstruction from a single omnidirectional image, using two different networks. As is known, a lightfield is a vector function, meaning that it includes information about the direction of incident light as well as magnitude.

As is known, a "cube map" or "cubemap" is a form of 360° computer graphics panorama consisting of six textures projected onto the six sides of a cube, which is usually centered on the camera or viewpoint. In embodiments, a first network-reconstruction network 50 (see FIG. 1)—is trained and learns to reconstruct the light field in cubemap projection (CMP) format given the six cube faces of an omnidirectional image and the corresponding cube face positions as input. The cubemap format implies a linear reprojection, which is more appropriate for a neural network such as the reconstruction network 50.

A second neural network—a refinement network 70 (see FIG. 1)—refines the reconstructed cubemaps in equirectangular projection (ERP) format by removing cubemap border artifacts. The refinement network learns the geometric features implicitly for both translation and zooming by application of an appropriate cost (or, "loss") function, which may be chosen using known design considerations. This second network can run with relatively very low inference time, which makes the invention suitable for use even in real-time applications. Tests show that LFSphereNet outperforms state-of-the-art approaches in terms of quality and speed when tested on different synthetic and real world scenes.

LFSphereNet improves upon known learning-based methods by reconstructing multiple spherical light field (LF) representations 80 (FIG. 1) from a single omnidirectional image (ODI). Although ODIs already provide 3DoF, spherical LF reconstruction extends these to 6DoF.

Figure 1:
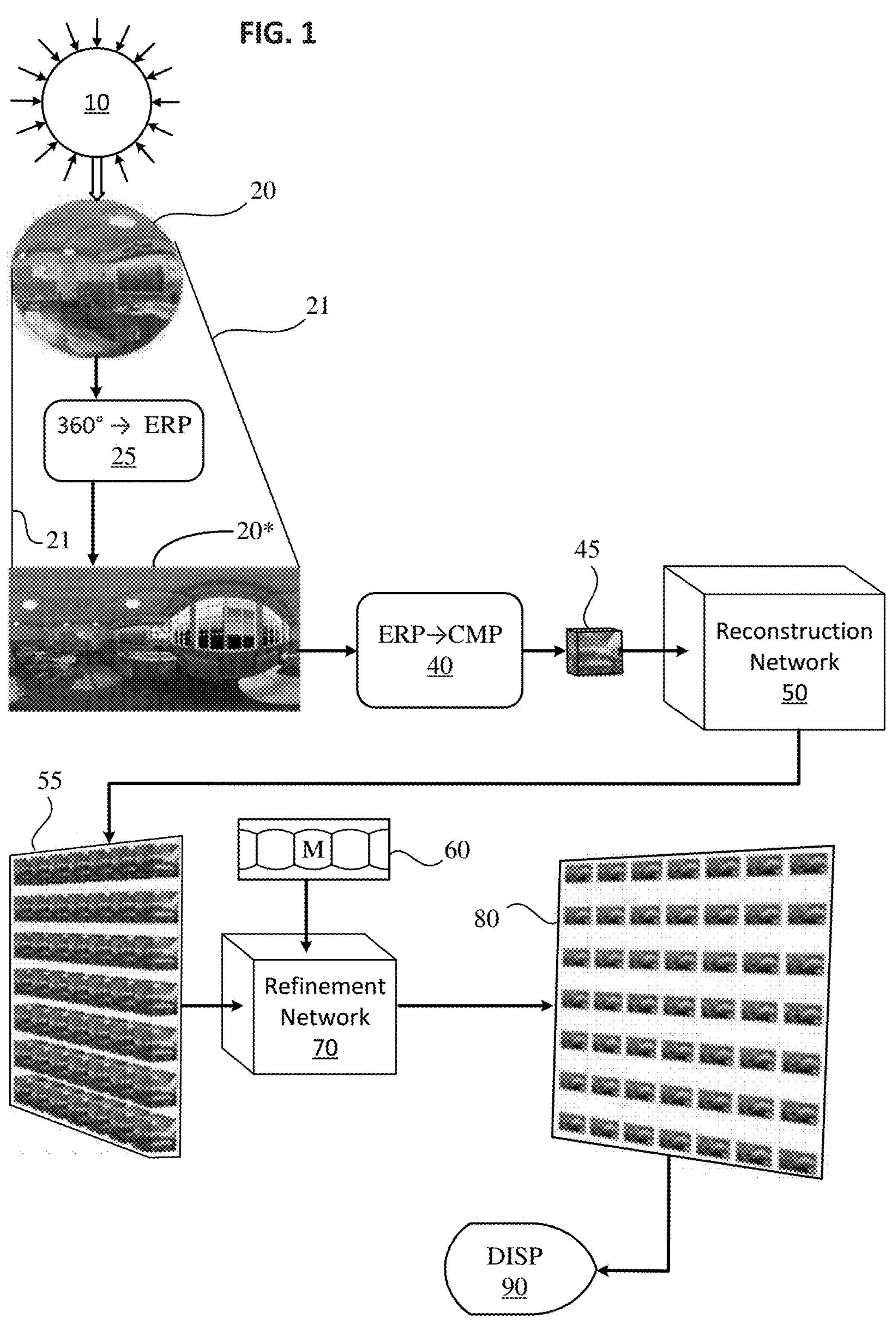
FIG. 1 depicts the main processing steps of a network for cubemap light field reconstruction and a refinement network for cube borders according to an embodiment of the invention.

FIG. 1 illustrates the main components and processes used in embodiments of the invention. First, an image or video capture and recording device (here referred to generally as a "camera" merely for the sake of succinctness) 10 captures a series of omnidirectional or video frames or wide-angle video frames of the surrounding environment to create the ODI 20. Each frame is then converted, using any preferred, known algorithm, into an Equirectangular Projection (ERP) image 20*, which forms an intermediate data representation, by a corresponding software module 25, which could be within the camera itself, or in a separate processing system, for example, the same one in which the main processing components (such as the networks 50, 70 described below) are located. The ERP image is then converted into a cubemap 45 by another corresponding software module 40, which may use known algorithms to do the conversion, and this frame data, now in CMP format, is passed as an input to the reconstruction system 50.

LFSphereNet's main processing pipeline, depicted in FIG. 1, includes two networks, which take the ERP image 20* and its corresponding cubemap (CMP) representation 45 as an input. As mentioned above, cubemaps are tangent images (represented by the tangent lines 21 connecting the images 20 and 20*) of a sphere with only minor distortions. Re-rendering of such tangent images creates a linear reprojection 55, which enables the system to utilize traditional convolution kernels without any modification in the network for cubemap re-rendering.

In one test embodiment, to achieve a better generalization of the first network 50, and to produce sharper images given only a relatively small amount of training data, a pre-trained convolutional neural network, in one test, the known ResNet-152 (see, for example, Kaiming He, et al., "Deep residual learning for image recognition", Proceedings of the IEEE conference on computer vision and pattern recognition. 770-778, 2016), was used as a feature extractor block 200 (FIG. 2A) for leveraging the feature representations. Image quality was then refined in the second network 70, which corrected pixel mis-alignments at cube borders, and thus produced N×N spherical LF representations 80. The speed of this embodiment was limited to the network inference time itself, in one test with a low inference time of 0.06 seconds; this makes the embodiment suitable for real time application. Other embodiments include various network variations that prioritize inference speed at the cost of image quality.

For one test, to meet the need of spherical LF datasets, the inventors rendered a synthetic spherical LF dataset by using open-source virtual scenes. This test dataset contained 120 spherical LF images, which was suitable for use in training and testing spherical LF reconstruction models. In the test, a small scale real world spherical LF dataset was also created consisting of seven horizontally placed, photographic ODIs to test the generalization the embodiment on real world scenes.

In one test embodiment, a spherical light field dataset was rendered in Blender based on five open source scenes, for training and evaluation of LFSphereNet. The dataset contained 120 spherical light fields of size 1024×2048×7×7. A real world spherical light field dataset was captured to evaluate the generalization of LFSphereNet. The small scale dataset contained six spherical light fields of size 1024×2048×1×7.

Embodiments reconstruct a spherical light field (LF) from a single omnidirectional image (ODI) 20. The LF represents the spatial and angular information of a scene, which can be represented by a H×W×N×N image, where H×W is the spatial resolution and N×N is the angular resolution. This allows the invention to provide a solution to the known problems of viewpoint change and refocusing. LF reconstruction methods are used to extend view synthesis methods by producing a dense N×N LF from a single or a few input views. Therefore, LFSphereNet's LF reconstruction method eliminates the requirement of using a multi-camera rig to capture the LF.

Formats for Omnidirectional Image Data

Equirectangular Projection (ERP) is a known way to represent ODIs. Due to its nature of having high distortion when moving to the polar regions, filter kernels of traditional convolutional neural networks (CNN) cannot be utilized as they cannot learn this distortion pattern. Attempts have been made to use spherical convolution kernels that increase in width when moving to the polar regions, but their effectiveness diminishes when the networks become deep. Furthermore, each region of an ERP image has different kernels, which do not share any information with each other. These different kernels between each overlapped region then require the use of a multi-scale alignment field to produce a single consistent feature map. Embodiments of this invention overcome these limitations of ERP by using the cubemap projection (CMP), which allows the use of standard CNN kernels.

As is mentioned above, embodiments of the invention create a spherical LF from a single ODI using two different networks, as depicted in FIG. 1, which allows for 6DoF viewing. The first network 50 performs spherical LF reconstruction in the CMP format. The second network 70 performs a spherical LF refinement in the ERP format and conceals artifacts near the image borders of the cube faces from the first network. Embodiments thus use a reconstruction network, a refinement network, and evaluation and use of loss functions. These features are described below, after which implementation details are discussed.

Reconstruction Network

Figure 2A:
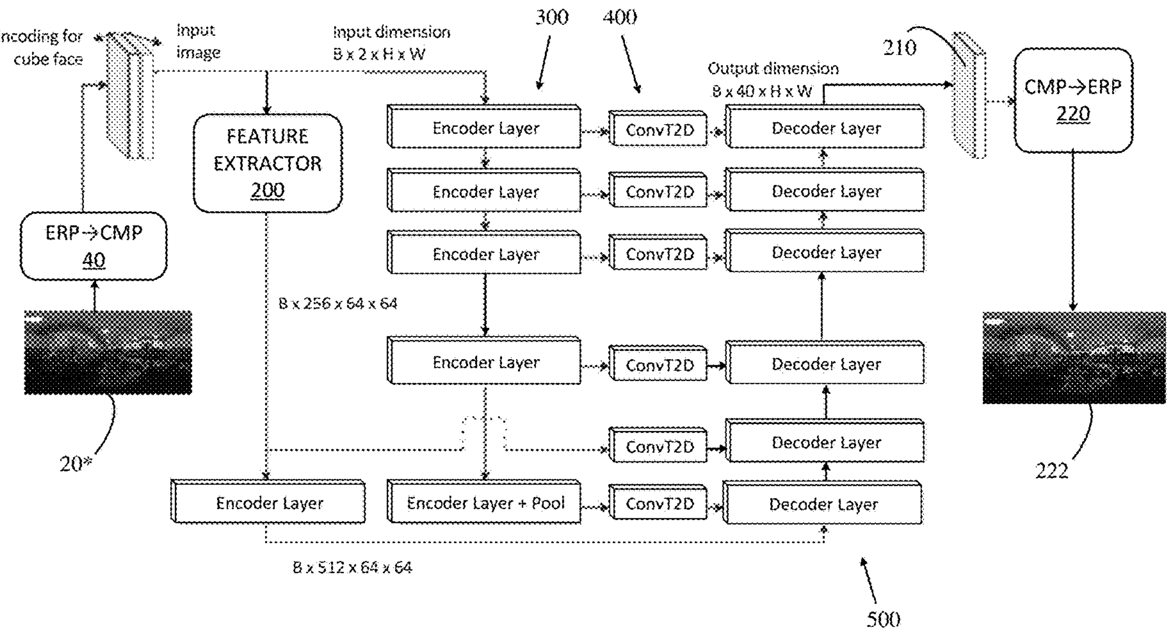
FIG. 2A illustrates the reconstruction network architecture used in one embodiment.

See FIG. 2A, which illustrates one embodiment of a reconstruction network architecture, in which the input has two information channels, one for the scene and one for the encoded cube face. Network components include Encoder layers (some with pooling), a Feature extractor, Decoder layers and Convolution transpose (ConvT2D). Here, B=Batch size, H=Height, W=Width.

FIG. 2A depicts three main processing layers of the reconstruction network 50: an encoder layer 300, a transposed convolution layer 400 and a decoder layer 500, containing processing modules ReLU, Conv2D and ConvTranspose2D, respectively, all of which are known in the field of neural networks. The structures of each of the components in these three layers are illustrated in FIGS. 2B, 2C and 2D, respectively. ReLU stands for "Rectified Linear Unit" and is an activation function defined as the positive part of the argument of $$f(x) = x^+ = \max(0, x) = \frac{x + |x|}{2} = \begin{cases} x & \text{if } x > 0, \\ 0 & \text{otherwise} \end{cases}$$

and is described, for example, at en.wikipedia.org/wiki/Rectifier_(neural_networks)

Conv2D is also a known function used in neural networks. It applies a 2D convolution over an input signal composed of several input planes. See, for example, pytorch.org/docs/stable/generated/torch.nn.Conv2d.html.

ConvTranspose2D applies a 2D transposed convolution operator over an input image composed of several input planes. This module can be seen as the gradient of Conv2D with respect to its input. It is also known as a fractionally-strided convolution or a deconvolution, although it is not an actual deconvolution operation as it does not compute a true inverse of convolution. See, for example, pytorch.org/docs/stable/generated/torch.nn.ConvTranspose2d.html and github.com/vdumoulin/conv_arithmetic/blob/master/README.md)

The reconstruction network 50 reconstructs the LF in CMP format given a single ODI as input. The input ODI is in ERP format, $L_{ERP}(x,0)$ is the central image of a spherical N×N LF, where 0 indicates the center, and x are the spatial coordinates (x,y). The ODI in ERP format is transformed into the CMP format by the module 40, with its six cube faces $$L_{CMP}^{i} \text{ with } i \in \{(\theta_1, \phi_1) \ldots (\theta_6, \phi_6),$$

where θ and ϕ are the longitude and latitude angles in ERP.

A cube face with angle i is then reconstructed by the network 50 into an array 55 of cube faces $$\hat{L}_{CMP}^{i}(x, u),$$

where:

$$\hat{L}_{CMP}^{i}(x, u) = r\left(L_{CMP}^{i}(x, 0), i\right),$$

r represents the reconstruction function of the LF for each cube face $$L_{CMP}^{i}(x, 0),$$

and u are the angular coordinates (u,v) of the reconstructed cube face array. The reconstruction function is then modeled by the encoder-decoder network 300/400/500. In one test embodiment, this encoder-decoder network used an architecture similar to U-Net (Olaf Ronneberger, et al., "U-net: Convolutional networks for biomedical image segmentation", *Medical Image Computing and Computer-Assisted Intervention—MICCAI* 2015: 18th International Conference, Munich, Germany, Oct. 5-9, 2015, Proceedings, Part III 18. Springer, 234-241, 2015) as depicted in FIG. 2A. This network learns to model the geometric features implicitly.

Convolutional operations without any pooling may be used in the first three encoder layers of this reconstruction network. The pooling layers are preferably not used, in order to keep both local and global features of image without dimension reduction, which has been shown to perform better for reconstruction tasks.

The Pre-Trained Feature Extractor block 200 was used in the network to address the lack of training data, but may not be needed where sufficient data is available. The network in a prototype utilized a pre-trained ResNet-152, which was trained on the ImageNet dataset. Separate R,G and B channels were generated after three forward passes and then merged to the final RGB image. Applying a 2D convolution (layer 400) on a RGB image in a single pass could be avoided as the same kernel is then responsible for handling both cross-channel correlations and spatial correlations as described in François Chollet, "Xception: Deep learning with depthwise separable convolutions", Proceedings of the IEEE conference on computer vision and pattern recognition, 1251-1258, 2017. In addition, separating the RGB image into distinct channels serves as a form of data augmentation, tripling the amount of training data.

The features extracted by pre-trained networks have been shown to achieve better visual reconstruction results. The reconstruction network in this embodiment therefore used the first two layers of ResNet-152 and extracted 256 feature maps of 64×64 spatial dimension (shown as the data path B×256×64×64 in FIG. 2A). The network then further passed these feature maps to an additional encoder layer 300 with 512 filters resulting in 512 feature maps of size 64×64 pixels (shown as the data path B×512×64×64 in FIG. 2A). Therefore, the network not only could learn from the training data, but also use the information extracted from the ResNet.

Upsampling of feature maps extracted from the ResNet-152 block and the last two encoder layers is advantageous since the low spatial dimension of feature maps usually needs to be upscaled to the original resolution of the image. When upsampling these feature maps at the decoder layer 500, the network uses a learning-based upsampling to upsample the feature maps without explicitly defining the upsampling method as is done in, e.g., bilinear or bicubic interpolation. As one example of such learning-based upsampling, see Haoyu Ren, et al., "Image super resolution based on fusing multiple convolution neural networks", *Proceedings of the IEEE conference on computer vision and pattern recognition workshops.* 54-61, 2017. A comparison between the learning-based upsampling and bilinear and bicubic upsampling is shown below as the results of an ablation study.

Refinement Network

The refinement network 70 in LFSphereNet resolves artifacts at the intersection of the cubemap faces. These artifacts are the results of discontinuities at the cubemap boundaries.

The refinement network 70 therefore transforms the cube faces $$\hat{L}_{CMP}^{i}(x, u)$$

Figure 3:
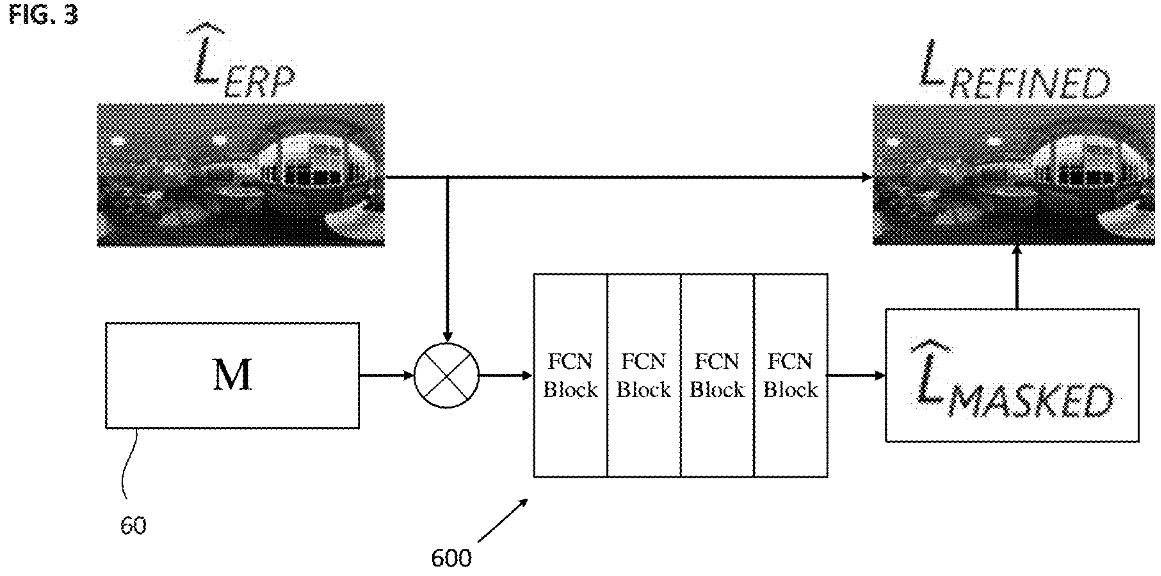
FIG. 3 illustrates a refinement network that masks out and refines borders of the cubemap.

(shown as block 210) in CMP format to faces $\hat{L}_{ERP}(x,u)$ 222 in ERP format in a module 220. The pixels close to the borders of the cube faces are particularly distorted after the transformation back to ERP format. A binary mask M (shown as component 60 in FIG. 1) is therefore preferably created for these pixel locations and is used to guide the refinement network 70 to improve the quality of pixels in border regions. The refinement network 70 takes the mask M, masks off the whole ERP image and only works with a specified width (in one test, 40 pixels, although this is a variable implementation detail) at border regions. The refinement step can be expressed as:

$$\hat{L}_{MASKED}(x, u) = e\left(\hat{L}_{ERP}(x, u) \odot M\right)$$

where e denotes the refinement network. FIG. 3 illustrates how the Refinement Network masks out and refines borders of the cubemap. As illustrated in FIG. 3, it may be implemented as a fully convolutional network (FCN) 600 and may be built with the same encoder layers as the reconstruction network. The final refined ERP image may be created by replacing the pixels of $\hat{L}_{ERP}$ with the pixels of the refined masked image $\hat{L}_{MASKED}(x,u)$ as follows:

$$L_{REFINED}(x,u)=\begin{cases}\hat{L}_{ERP}(x,u), \text{ if } M(x,u)=0\\ \hat{L}_{MASKED}(x,u) \text{ otherwise.}\end{cases}$$

A standard convolution kernel can be applied in this network as it focuses on only a narrow width of pixels instead of the whole ERP image. Hence, the network does not need to learn the distortion pattern of ERP images.

Loss Functions

The two networks of the proposed LFSphereNet are preferably trained using two different loss functions, although this is a design choice. The reconstruction network learns a function r by minimizing the error with respect to its parameters $\beta_r$:

$$\min_{\beta_r}\sum_b\sum_{i=1}^{6}\left\|L_{CMP}^i-\hat{L}_{CMP}^i\right\|$$

where b is the number of training samples.

The refinement network works with the masked image and outputs the refined masked image $\hat{L}_{MASKED}$(x,u). For training the refinement network, the ground truth masked ERP $L_{MASKED}$(x,u) can be generated by applying the same mask M as above, that is:

$$L_{MASKED}(x,u)=e(L_{ERP}(x,u)\odot M)$$

The refinement network then learns the function e by minimizing the error with respect to its parameters $\beta_c$:

$$\min_{\beta_e}\sum_b\left\|L_{MASKED}-\hat{L}_{MASKED}\right\|$$

The loss function(s) chosen for the two networks may be varied according to different situations, for example by applying an L2 or other norm instead, although such higher order metrics may lead to more computational cost than their possibly small improvements would justify. The visual results of applying different loss functions and assuming photometric consistency was studied in, for example, Hang Zhao, et al., "Loss functions for image restoration with neural networks", *IEEE Transactions on computational imaging* 3, 1 (2016), 47-57; and Hang Zhao, et al., "Loss functions for image restoration with neural networks", *IEEE Transactions on computational imaging* 3, 1 (2016), 47-57. As described in Zhao et al., the L1 loss is more robust to outliers compared to L2 loss because it does not heavily penalize large errors. Therefore, L1 loss is the preferred norm for both networks.

Implementation

Described here is one implementation of an embodiment of the invention that was used to test the method and architecture of the invention, was also able to provide quantitative data. The input of LFSphereNet in this implementation was a single channel of a RGB image at a time along with an extra channel that contained the direction of the cube face. The direction of the cube face was denoted by angles (0, 0), which were normalized between 0 to 1. The value of θ was stored in the first half of the extra channel, [1:Height]×[1:Width/2] and ϕ in the second half. LFSphereNet was implemented in PyTorch and trained with the following hyperparameters: batch size of 16, learning rate of 0.003, adam optimizer, L1 loss and L2 as a regularizer. After each 20 epochs, the learning rate was decreased by a factor of 0.5. The network was trained for 150 epochs on 4 GPUs (Nvidia A100) within a computing cluster with Intel Xeon Gold 6338 CPUs. The training duration was 42 hrs. For the dataset-split, 75% of the data used for was used for training, 12.5% for validation and 12.5% for testing.

Experiments for Planar LF

The inventors were able to demonstrate that the reconstruction network 50 of LFSphereNet, although designed for ODIs, also achieved comparable results to the state-of-the-art in planar LF reconstruction from a single or few input images. Planar LF reconstruction requires neither the refinement network 70 nor the encoding of the rotational camera angles in the input because the virtual camera only faces the frontal direction. Therefore, the inventive reconstruction network was modified for this experiment such that the positional encoding was removed from the input.

For the experiment, the publicly available datasets known as Lytro Flowers, Stanford and JPEG-Pleno were used for testing LFSphereNet as well as the state-of-the-art methods NoisyLFRecon, DGLF, DALF, and IR-V. The LF images extracted from these datasets were of size 352×512×7×7. 75% of the images from the datasets Flowers and Stanford were used for training. The JPEG-Pleno dataset was only used for testing and not for training.

The output was tested against ground truth data by employing the known metrics mean absolute error (MAE), peak signal-to-noise ratio (PSNR), structural similarity index measure (SSIM), multi-scale structural similarity index measure (MS-SSIM), features similarity index matrix (FSIMC), pixel-based visual information fidelity (VIFP), deep image structure and texture similarity (DISTS), and learned perceptual image patch similarity (LPIPS).

The reconstruction of planar LF by LFSphereNet was compared against the current state-of-the-art methods NoisyLFRecon, DGLF, DALF, and IR-V. All models were trained from scratch using the same datasets. The publicly available codes were used for IR-V, DGLF and NoisyLFRecon, whereas DALF was re-implemented in PyTorch according to the information presented in the paper Xiaodong Cun, et al., "Depth-Assisted Full Resolution Network for Single Image-Based View Synthesis", *IEEE Computer Graphics and Applications* 39 (2019), 52-64, Issue 2. The quality of the rendered light field for each network is presented in Table 1.

NoisyLFRecon performed best while LFSphereNet was second best for the Lytro Flowers dataset. However, NoisyLFRecon required nine images as input while LFSphereNet needed only a single image as input. Both DGLF and DALF also take a single image as input, but DGLF generates the full N×N LF at once, whereas DALF outputs one sub-aperture at a time. For the Stanford dataset, which contains significantly fewer training images compared to the Flowers dataset, LFSphereNet outperformed the remaining methods in each metric except SSIM and MS-SSIM. For JPEG-Pleno, which was not used for training, LFSphereNet outperformed the remaining methods, proving better generalization. Although DALF is also built on a encoder-decoder architecture, the usage of an additional depth estimation network increases its overall inference time. The measured inference times for reconstructing a single LF image of size 352×512×7×7 on a GTX 1080Ti GPU were: 1.8130 seconds for NoisyLFRecon, 1.5009 seconds for DGLF, 0.0583 seconds for DALF, 0.1429 for IR-V, and 0.0008 seconds for LFSphereNet.

TABLE 1 shows results for Planar LF Reconstruction: Quality, best values in bold, second best in *italics*. Arrows indicate the better direction. References ([11], [17], [56], [57]) that describe the non-LFSphereNet system are listed below the table.

| Dataset | Method | MAE ↓ | PSNR ↑ | SSIM ↑ | MS-SSIM ↑ | FSIMC ↑ | VIFP ↑ | DISTS ↓ | LPIPS ↓ |
|---|---|---|---|---|---|---|---|---|---|
| lowers [36] | NoisyLFRecon [57] | **0.0095** | *39.9500* | **0.9763** | **0.9932** | **0.9847** | **0.9285** | **0.0389** | **0.0190** |
| Train Images: 2181 | DGLF[56] | 0.0489 | 35.6194 | 0.8773 | 0.9301 | 0.8947 | 0.6021 | 0.1556 | 0.1431 |
| Test | DALF[11] | 0.0172 | 37.3006 | 0.8941 | 0.9589 | 0.9295 | 0.7362 | 0.1033 | 0.0911 |
| Images: | IR-V[17] | 0.0163 | 37.9034 | 0.9122 | 0.9645 | 0.9415 | 0.7324 | 0.0994 | 0.0707 |
| 363 | LFSphereNet | *0.0109* | **41.3719** | *0.9461* | *0.9868* | *0.9680* | *0.9060* | *0.0812* | *0.0512* |
| Stanford [29] | NoisyLFRecon [57] | 0.0185 | 35.4917 | *0.9572* | 0.9771 | 0.9620 | 0.8380 | 0.0718 | 0.0395 |
| Train Images: 264 | DGLF[56] | 0.0161 | 35.6509 | **0.9673** | **0.9897** | *0.9683* | *0.8655* | 0.0685 | *0.0321* |
| Test | DALF[11] | 0.0143 | 38.2996 | 0.9172 | 0.9750 | 0.9416 | 0.7829 | 0.0667 | 0.0402 |
| Images: | IR-V[17] | *0.0141* | *39.4909* | 0.9440 | *0.9852* | 0.9619 | 0.8358 | *0.0628* | 0.0390 |
| 45 | LFSphereNet | **0.0118** | **40.9830** | 0.9488 | 0.9797 | **0.9721** | **0.8842** | **0.0556** | **0.0300** |
| JPEG Pleno [31] | NoisyLFRecon [57] | 0.0234 | 36.6275 | **0.9575** | 0.9687 | *0.9610* | *0.8549* | **0.0718** | *0.0435* |
| Train Images: 0 | DGLF[56] | 0.0489 | 32.3387 | 0.7207 | 0.8166 | 0.8223 | 0.4246 | 0.1556 | 0.1431 |
| Test | DALF[11] | 0.0282 | 35.0285 | 0.8257 | 0.9291 | 0.8828 | 0.6462 | 0.1095 | 0.0937 |
| Images: 10 (Trained on Flowers) | IR-V[17] | *0.0208* | *37.2085* | 0.9122 | *0.9719* | 0.9357 | 0.7878 | 0.0894 | 0.0605 |
| | LFSphereNet | **0.0168** | **39.2624** | *0.9429* | **0.9879** | **0.9618** | **0.9069** | *0.0737* | **0.0425** |

[11]: See Xiaodong Cun, et al., "Depth-Assisted Full Resolution Network for Single Image-Based View Synthesis", IEEE Computer Graphics and Applications 39 (2019), 52-64. Issue 2. doi.org/10.1109/MCG.2018.2884188

[17]: Kang Han, et al., "Inference-Reconstruction Variational Autoencoder for Light Field Image Reconstruction", IEEE Transactions on Image Processing 31 (2022), 5629-5644. doi.org/10.1109/TIP.2022.3197976

[56] Wenhui Zhou, et al., "Depth-guided view synthesis for light field reconstruction from a single image", Image and Vision Computing 95 (2020), 103874. doi.org/10.1016/j.imavis.2020.103874

[57]: Wenhui Zhou, et al., "Robust dense light field reconstruction from sparse noisy sampling", Signal Processing 186 (9 2021). doi.org/10.1016/j.sigpro.2021.108121

Experiments for Spherical LF

The inventors also tested LFSphereNet on a spherical LF dataset. Because no spherical LF dataset was available—the present invention is, after all, unique—the inventors created a spherical LF dataset to enable both training and evaluation of the proposed system. The dataset was rendered in Blender with 1024×2048 spatial resolution and 7×7 angular resolution. Python code written by Gu et al. (Omni-NeRF: Neural Radiance Field from 360° Image Captures. (2022), 1-6, found at doi.org/10.1109/icme52920.2022.9859817) was modified to match the uniform camera array requirement. To create this spherical LF dataset, five freely available virtual scenes on the Blender demo website were used, including two outdoor scenes (Lone Monk and Barcelona) and three indoor scenes (Classroom, Barbershop and Italian Flat). The spherical camera array was placed at different locations in the scenes to capture multiple images from each scene. The number of different locations varied from 10 to 30 depending on the size of the scene, resulting in a total of 120 spherical LFs. The lens type of each spherical camera was set to panoramic and the panorama type was set to equirectangular. The baseline between each subsequent sub-aperture ODI was set to 1 cm.

A real spherical LF dataset was created to verify the generalization of the method of the invention described above on real world scenes. The acquisition of such real spherical LF dataset with 7×7 ODI camera grid is challenging as each ODI camera occludes the other one due to their 360° FoV (field of view) nature. In order to overcome this limitation of occlusion, a single Insta 360 X3 camera was mounted on an Atlas 200 dolly which was programmed to move the camera 1 cm at a time in horizontal direction. A 1×7 spherical LF could thus be acquired. Capturing the 7×7 LF was not feasible as the vertical movement was not precise enough. In total, six different spherical LFs were captured with 1×7 angular resolution.

Given the novelty of this invention, the inventors were not able to compare LFSphereNet against any other spherical LF reconstruction methods since, to the inventors' knowledge, no other such methods exist. Thus, LFSphereNet was tested against the ground truth data and existing 360° view synthesis networks which were modified to enable spherical LF reconstruction. The publicly available code from 360ViewSynth and PanoSynthVR was used and the inference step was modified for creating a spherical LF of size 1024×2048×7×7. These methods output a single view, i.e. sub-aperture ODI, at a time, hence, the inference requires N×N steps. For the objective evaluation, the inventors used the same metrics as described above.

All models were trained on the same training datasets, which included Lone Monk, Barcelona, and Italian Flat scenes. Data augmentation was used to further increase the amount of training images, resulting in a total of 150 LFs for training. For testing and validation, Barbershop and Classroom scenes were used, which were not used in the training. In total, 25 LFs were used for validation and another 25 LFs were used for testing. To test the model on the real spherical LF dataset, the model was first trained on the synthetic dataset with angular resolution set to 1×7, followed by retraining the model again on four out of six LFs from the real spherical LF dataset. The remaining two spherical LFs were used for testing.

The comparison results of PanoSynthVR, 360ViewSynth and LFSphereNet with and without the refinement network are presented in Table 2 for the synthetic and in Table 3 for the real dataset, respectively. LFSphereNet outperformed these two methods in all metrics except DISTS and LPIPS, where PanoSynthVR showed better results. The 360ViewSynth showed worse results compared to PanoSynthVR because it uses a splatting operator on predicted depth, and for the part of the scene where depth is at infinity, it performs worse. The last column in Table 2 and Table 3 shows the improvement when using the refinement network.

The inference times to reconstruct the seven ODIs are shown in the last row of Table 2. As can be seen, LFSphereNet performed much faster, since it reconstructs the whole LF at once. The values presented for the real world dataset in Table 3 show slightly worse results when compared to the synthetic dataset in Table 2. This decrease in performance is related to the size of training data used. The real world dataset has only four spherical LF images to learn from. In Table 3, 360ViewSynth shows better DISTS, LPIPS, PSNR, and VIFP compared to the other two methods. However, the visual results indicated that it fails to produce geometrically correct ERP images. Only the objects at the front and back of the sphere moved slightly while the remaining regions remain fixed at the same place, i.e., did not have parallax compared to the input view. Hence, these synthesized views are similar to the input view, which explains the better DISTS, LPIPS and VIFP values for 360ViewSynth.

In Tables 2 and 3, results for 360ViewSynth are shown in the column with the header [58](see Nikolaos Zioulis, et al., "Spherical View Synthesis for Self-Supervised 360° Depth Estimation. *Proceedings*—2019 *International Conference on* 3*D Vision,* 3*DV* 2019 (2019), 690-699. doi.org/10.1109/3DV.2019.00081); [42] indicates PanoSynthVR, as described in John Waidhofer, et al., "PanoSynthVR: Toward Light-weight 360-Degree View Synthesis from a Single Panoramic Input", 2022 IEEE International Symposium on Mixed and Augmented Reality (ISMAR), IEEE, 584-592.

TABLE 2

Spherical LF Reconstruction (1024 × 2048 × 7 × 7) on Synthetic Dataset: Quality and Average Runtime (s), best values in bold

| | RF Reconstruction Methods | | | |
|---|---|---|---|---|
| Metrics | [58] | [42] | LFSphereNet* | LFSphereNet |
| MAE↓ | 0.0922 | 0.0265 | 0.0130 | **0.0125** |
| DISTS↓ | 0.1215 | **0.0531** | 0.0877 | 0.0880 |
| LPIPS↓ | 0.1935 | **0.0670** | 0.0860 | 0.0825 |
| PSNR↑ | 32.89 | 34.76 | 37.14 | **37.45** |
| SSIM↑ | 0.6495 | 0.7878 | 0.9052 | **0.9121** |
| MS-SSIM↑ | 0.7690 | 0.8687 | 0.9660 | **0.9691** |
| FSIMC↑ | 0.8443 | 0.9148 | 0.9573 | **0.9573** |
| VIF↑ | 0.3710 | 0.4978 | 0.8005 | **0.8035** |
| Runtime↓ | 12.4845 | 2.7077 | **0.0589** | 0.0606 |

LFSphereNet* is without refinement network.

[42]: John Waidhofer, et al., "PanoSynthVR: Toward Light-weight 360-Degree View Synthesis from a Single Panoramic Input", 2022 IEEE International Symposium on Mixed and Augmented Reality (ISMAR). IEEE, 584-592.

[58]: Nikolaos Zioulis, et al., "Spherical View Synthesis for Self-Supervised 360° Depth Estimation", Proceedings—2019 International Conference on 3D Vision, 3DV (2019), 690-699. doi.org/10.1109/3DV.2019.00081

TABLE 3

Spherical LF Reconstruction (1024 × 2048 × 1 × 7) on Real Dataset: best values in bold

| | LF Reconstruction Methods | | | |
|---|---|---|---|---|
| Metrics | [58] | [42] | LFSphereNet* | LFSphereNet |
| MAE↓ | 0.0414 | 0.0746 | 0.0369 | **0.0365** |
| DISTS↓ | **0.0221** | 0.0906 | 0.0848 | 0.0848 |
| LPIPS↓ | **0.0728** | 0.2381 | 0.1573 | 0.1572 |
| PSNR↑ | **34.14** | 30.20 | 32.42 | 32.44 |
| SSIM↑ | 0.7044 | 0.5682 | 0.7361 | **0.7402** |
| MS-SSIM↑ | 0.8052 | 0.5784 | 0.8563 | **0.8565** |
| FSIMC↑ | 0.8767 | 0.7412 | 0.8944 | **0.8957** |
| VIF↑ | **0.5294** | 0.2204 | 0.4909 | 0.4916 |

LFSphereNet* is without refinement network.

Ablation Study

An ablation study was carried out to understand the impact of different design choices, in particular for the reconstruction network of LFSphereNet. Different variations of the reconstruction network were trained, combined with the same refinement network to compare and learn the effect of each component. These configurations were designated:

LFSphereNet-NoResNet: Network without any pre-trained feature extractor

LFSphereNet-Bicubic and LFSphereNet-Bilinear: Networks with bicubic or bilinear upsampling instead of the proposed learning-based one, LFSphereNet-RGB: Network with RGB input instead of single color channels at a time, and LFSphereNet: The preferred embodiment, described above. The architecture of the refinement network was kept unchanged as it is not affected by any of these design choices, but it is necessary to be trained for each case to make it a fair comparison.

Each variation of the network was trained with the same hyperparameters and on the same dataset, mentioned above. The quantitative results are shown in Table 4. These results are discussed below.

TABLE 4

Ablation Study for Light Field Reconstruction (1024 × 2048 × 7 × 7): Quality, Average Runtime (sec.) and #Network Parameters, best values in bold,

| | LFSphereNet-(Variation) | | | | |
|---|---|---|---|---|---|
| Metric | NoResNet | Bicubic | Bilinear | RGB | [Main] |
| MAE ↓ | 0.0160 | 0.0127 | 0.0126 | 0.0153 | **0.0125** |
| DISTS ↓ | 0.1043 | 0.0891 | 0.0886 | 0.0972 | **0.0880** |
| LPIPS ↓ | 0.0939 | 0.0827 | 0.0832 | 0.0858 | **0.0825** |
| PSNR ↑ | 34.55 | 37.33 | 37.29 | 34.76 | **37.45** |
| SSIM ↑ | 0.8483 | 0.9110 | **0.9121** | 0.8580 | **0.9121** |
| MS-SSIM ↑ | 0.9186 | **0.9692** | 0.9688 | 0.9229 | 0.9691 |
| FSIMC ↑ | 0.9529 | 0.9569 | 0.9570 | 0.9566 | **0.9573** |
| VIFP ↑ | 0.7257 | 0.8024 | 0.8028 | 0.7499 | **0.8035** |
| Runtime ↓ | **0.0050** | 0.0626 | 0.0551 | 0.0131 | 0.0606 |
| #Param. | 13.4E6 | 19.6E6 | 19.6E6 | 19.3E6 | 19.2E6 |

Pre-trained Feature Extractor: When the pre-trained feature extractor based on ResNet-152 was removed in the "NoResNet" case, as Table 4 shows, this led to worst results-compared to any other variation of the network. Without the feature extractor block, some object features could not be extracted when a new scene was given to the network, resulting in worse generalization.

Upsampling: When "bilinear" and "bicubic" upsampling modes were used, i.e. in "LFSphereNet-Bilinear" & "LFSphereNet-Bicubic", the results showed a small decrease in quality compared to the preferred embodiment of LFSphereNet, as suggested by the metrics in Table 4. Visually, the quality of the output did not differ noticeably.

RGB Mode: In LFSphereNet, a single color channel at a time was used as input to avoid using a single convolution kernel for handling both cross-channel correlation and spatial correlations. To support this design choice, the network was tested by passing full RGB images in "LFSphereNet-RGB" for validation. As seen in Table 4, this gave overall worse results, similar to the "LFSphereNet-NoResNet". Hence, we conclude that the shared weights in standard 2D convolutions can lead to a loss of discriminative power between channels, and as a result, the learned filters may not be able to distinguish between different features in the input image. However, this design choice can be used if the amount of training data is significantly large.

Inference Time and Visual Quality: Comparing the inference times, the LFSphereNet-NoResNet performed fastest since it removes the ResNet-152 layers from the architecture, thereby reducing the number of parameters from 19 Million to 13 Million. LFSphereNet-RGB showed the second best inference time as it takes just one forward pass to reconstruct the results. These two network variations are well suited for applications that might require very low inference time, at the cost of slightly degraded visual quality.

Networks of different upsampling modes displayed inference times close to those of the preferred embodiment. These upsampling modes are LFSphereNet-Bicubic and LFSphereNet-Bilinear. Hence, as a design choice, it is well suited to use the default network as there is no significant gain in visual quality and inference time when using different upsampling modes.

System Implementation and Example Applications

The invention can be put to use in most telepresence systems, to generate images that can be superimposed on other images in an Augmented Reality system, etc. The main system components are the image capture system 10, that is, one or more cameras capable of capturing, for example, a 360° spherical image, a processing system comprising one or more computing systems, such as server, to carry out the various computations involved in the Reconstruction and Refinement networks 50, 70, and some form of display system 90 (if the generated image is to be viewed by a person as opposed to being processed further by another computer system). One of the many examples of a camera system suitable for capturing a 360° spherical image is described above in relation to discussion of the tests of the different embodiments.

As for the display system 90 (FIG. 1), this could also be of any type that is able to display video frames and is suitable for enabling a user to view and move, either physically or virtually, in a 3D environment. This could be one or more projectors in a viewing room, a head-mounted display, VR goggles for a total telepresence in a remote 3D space, etc. Depending on the application, the display system may also include sensors that track the physical movements of the display, preferably with six degrees of freedom, and return this data to the reconstruction and refinement networks. In the case of VR or similar head-mounted displays, the invention's processing components would therefore have data indicating a user's head movements, and thus viewing position and angular orientation within the 3D space.

Augmented Reality (AR) Application

Another application is in the area of augmented reality (AR), in which the image generated by the invention is superimposed on a "real" view of an environment as viewed through AR glasses. The two networks above then render novel video frames from the sub-aperture of the captured environment for the viewport of the head-mounted or otherwise moving display according to the orientation and position of the user's head, that is, orientation of the display system. One of the advantages of the invention is speed: As demonstrated in tests (some of which are summarized above), LFSphereNet will in most cases be fast enough to enable such image generation and augmentation in real time. This capability enables embodiments of this invention to be used to provide a method and system for remote immersive navigation in real scenes.

Figure 4:
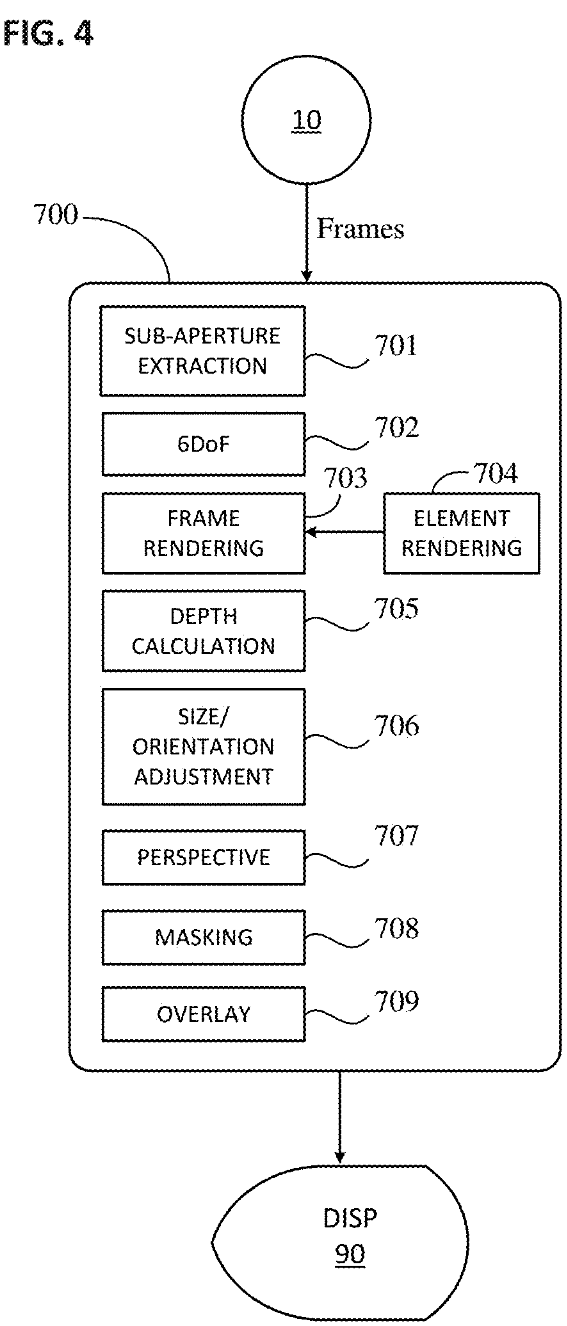
FIG. 4 depicts an embodiment that renders and overlays sub-aperture frame information onto an augmented reality display.

See FIG. 4. In this application (as well as others with similar requirements) the invention includes, in addition to the components illustrated in previous figures and described above, an overlay system 700 that receives the video frames of a plurality of omnidirectional video frames or wide-angle video frames from the camera 10 and extracts a plurality of omnidirectional sub-aperture video frames (in a software component 701) for each received video frame. The overlay system 700 may receive the frame data directly from the camera 10, or, preferably, from the reconstruction system shown in FIGS. 1-3 and described above; the latter option will be especially suitable if the overlay system 700 is included as part of the same software implementation or "package".

Each sub-aperture video frame will have a slightly different perspective of the captured surrounding environment than the captured omnidirectional or wide-angle video frame as a whole. The system 700 may then receive the tracked head position and orientation of the display system, interpret the corresponding signals in a 6DoF component 702, and, in a component 703, render novel video frames from the sub-aperture of the captured environment from the viewpoint of the display.

The system may then, in a corresponding component 704, also render one or more elements, which may be physical and/or virtual objects, textures, environment features, etc., and composite that element onto each sub-aperture video frame.

As part of the compositing, the system may apply known techniques in components 705, 706, to calculate the depth in the scene where the element is to be placed and then adjust the size and the orientation of the element according to its depth in the scene to be overlayed. The system may then adjust the perspective 707 of the element when the viewpoint of the user has changed; note that, in the general case, the viewpoint of the user will correspond to the position and orientation of the display device itself, that is, the "viewpoint" of the display, although the invention could be adapted to such display systems as head-up displays that incorporate eye-tracking as well. Using known techniques of projective geometry, the system may then, in a component 708, mask the rendered view of the element in accordance with the visual occlusion according to the depth or distance of the other real objects existing in the scene. The additionally rendered overlay frame may then be formatted in an overlay component 709 and passed to the display 90 to be included as an overlay onto the default, that is, current image it generates for viewing as a result of other input, such as from the reconstruction and refinement system 50, 70 as described above.

Note that the elements 701-708 shown in FIG. 4 may represent not only the respective software components, but also the processing steps they perform.

Computer Program Implementation

The various components that embodiments use to reconstruct the spherical light field from a single omnidirectional image, as well as those for generating a display overlay, are implemented in software, that is, as a one or more cooperating computer program(s), that is, computer-executable code that is stored in any known storage components of a computing system, that, when run, carry out the corresponding processes. This (or these) computer program(s) may be installed to run on a single computing platform, such as a server, or different components could be installed on different, mutually communicating platforms. As long as the network bandwidth and speed are sufficient, it would also be possible to provide the image-processing functions of the invention as a remotely accessible service, such as using "cloud computing". The program(s) may also be made available for download to users' own computing systems.

The system, in particular, the reconstruction network, may be connected to and receive the image data from the camera 10 in any suitable wireless or wired manner using any known technology that has sufficient bandwidth and speed to transmit the images, especially in real-time applications. The processing system may similarly transmit its results to the display system 90 using such known wireless or wired techniques.

The invention claimed is:

1. An image processing method comprising:

receiving frame data in an equirectangular projection (ERP) format from a camera that captures omnidirectional images of an imaged scene;

for each of at least one of the omnidirectional images, converting the frame data into a cubemap projection (CMP) format;

in a reconstruction network that is trained to reconstruct a spherical light field in cubemap projection (CMP) format, reconstructing a spherical light field (LF) from a single one of the omnidirectional images, where the spherical LF represents spatial and angular information of the scene, by reconstructing each of six cube faces $$(L^i_{CMP})$$

of cubes in the cubemap into an array of the cube faces $$(\hat{L}^i_{CMP}(x, u)).$$

2. The image processing method of claim 1, further comprising, in a refinement network, removing border artifacts from the cubemap and minimizing a loss function to extract image features for both translation and zooming in the cubemap.

3. The image processing method of claim 1, in which the camera captures spherical images.

4. The image processing method of claim 2, further comprising:

converting each cubemap, from which the border artifacts have been removed, into the ERP format; and applying the converted cubemap to a display system for viewing by a user.

5. The image processing method of claim 1, further comprising, reconstructing a plurality of omnidirectional sub-aperture video frames for each omnidirectional image received from the camera, where each sub-aperture video frame corresponds to a respective perspective of the scene;

receiving from a moving display system information indicating a position and orientation of the moving display system;

rendering additional video frames from the sub-aperture of the captured scene from a current viewpoint of the moving display system according to its current orientation and position; and causing the rendered additional video frames to be overlayed onto a default view of the scene displayed by the moving display system.

6. The method of claim 5, further comprising rendering at least one element and compositing each element onto each sub-aperture video frame.

7. The method of claim 6, further comprising:

calculating a respective depth in the scene at which each element is to be placed;

adjusting a size and angular orientation of each respective element according to its depth in the scene to be overlayed;

adjusting a perspective of each element when a viewpoint of the display system has changed; and masking the rendered view of the element corresponding to depth and/or distance-dependent visual occlusion caused by other real objects existing in the scene and being displayed.

8. An image processing system comprising:

a camera that captures omnidirectional spherical images of an imaged scene, each of which is transmitted in an equirectangular projection (ERP) and converted into a cubemap in a cubemap projection (CMP) format;

a computing platform including a reconstruction network that is trained to reconstruct a spherical light field in cubemap projection (CMP) format, and that reconstructs a spherical light field (LF) from a single one of the spherical images, where the spherical LF represents spatial and angular information of the scene, by reconstructing each of six cube faces $$(L^I_{CMP})$$

of cubes in the cube map into an array of the cube faces $$(L^I_{CMP}(x, u)).$$

9. The image processing system of claim 8, further comprising a refinement network that removes border artifacts from the cubemap and minimizes a loss function to extract image features for both translation and zooming in the cubemap.

10. The image processing system of claim 9, in which:

the refinement network further performs CMP-to-ERP format conversion of the cubemap; and further comprising a display that receives and displays the converted cubemap for viewing by a user.

* * * * *